United States Patent [19]

Ohkawa

[11] 4,292,126
[45] Sep. 29, 1981

[54] TOKAMAK WITH LIQUID METAL FOR INDUCING TOROIDAL ELECTRICAL FIELD

[75] Inventor: Tihiro Ohkawa, La Jolla, Calif.

[73] Assignee: The United States of America as represented by the United States Department of Energy, Washington, D.C.

[21] Appl. No.: 15,963

[22] Filed: Feb. 28, 1979

[51] Int. Cl.³ .............................................. G21B 1/00
[52] U.S. Cl. .................................................... 176/3
[58] Field of Search ........................... 176/1, 3, 9, 6–8

[56] References Cited

U.S. PATENT DOCUMENTS

| | | | |
|---|---|---|---|
| 3,037,921 | 6/1962 | Tuck | 176/3 |
| 3,708,391 | 1/1973 | Christofilos | 176/7 |
| 4,000,036 | 12/1976 | Ensley | 176/3 |

FOREIGN PATENT DOCUMENTS 2758866  6/1978  Fed. Rep. of Germany .......... 176/9
855859   12/1960 United Kingdom ................... 176/9

OTHER PUBLICATIONS

ORNL-TM3096, 5/73, Fraas, pp. 1, 10-30.
Proc. of the High Beta Workshop, 1975, Robson et al., pp. 60-77.

Primary Examiner—Harvey E. Behrend

[57] ABSTRACT

A tokamak apparatus includes a vessel for defining a reservoir and confining liquid therein. A toroidal liner disposed within said vessel defines a toroidal space within the liner confines gas therein. Liquid metal fills the reservoir outside the liner. A magnetic field is established in the liquid metal to develop magnetic flux linking the toroidal space. The gas is ionized. The liquid metal and the toroidal space are moved relative to one another transversely of the space to generate electric current in the ionized gas in the toroidal space about its major axis and thereby heat plasma developed in the toroidal space.

14 Claims, 4 Drawing Figures

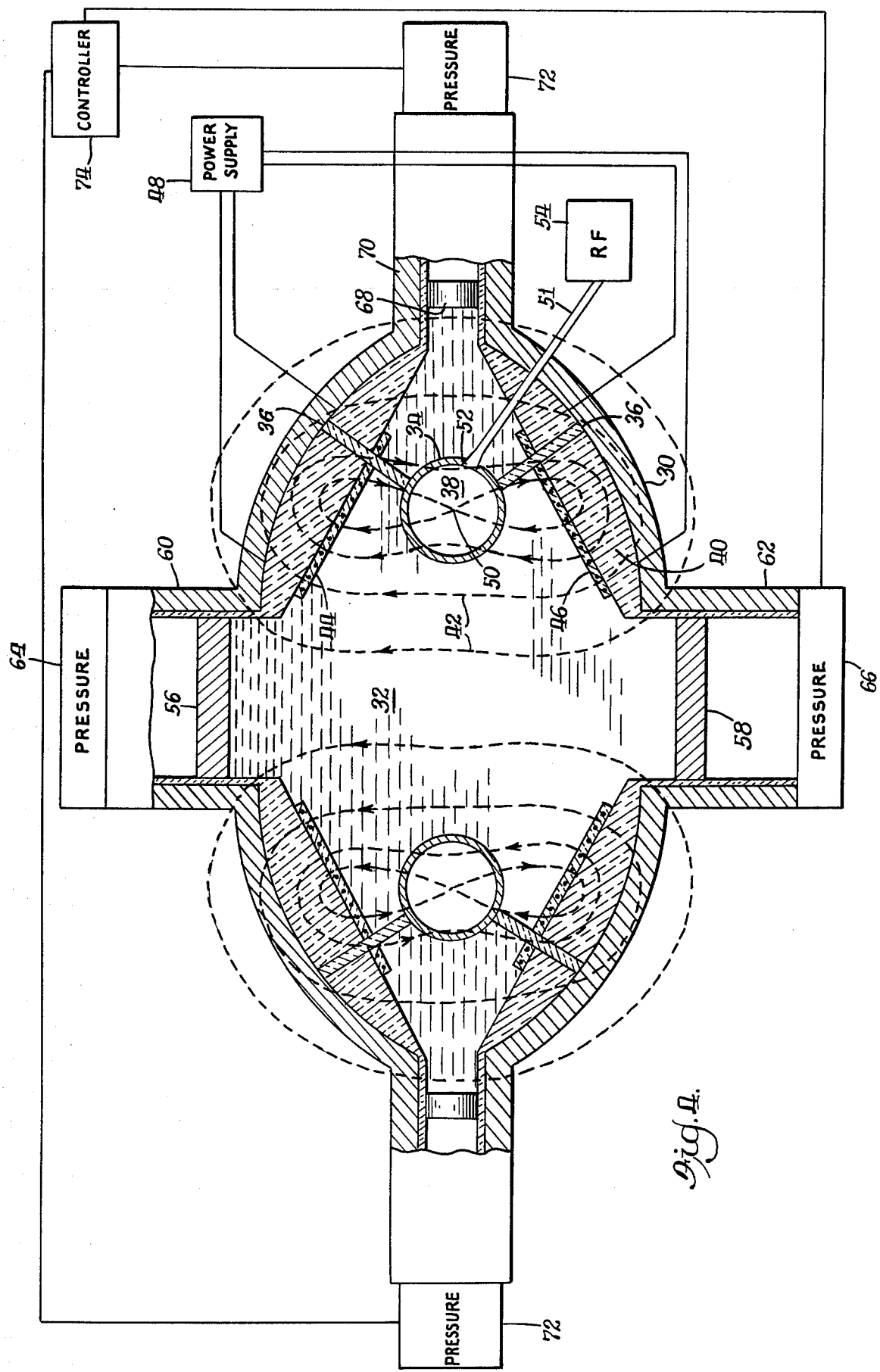

TOKAMAK WITH LIQUID METAL FOR INDUCING TOROIDAL ELECTRICAL FIELD

This invention relates generally to plasma devices, particularly such devices of the tokamak type. More particularly, the present invention relates to the generation of toroidal electric fields in such devices utilizing flowing liquid metal to induce the toroidal electric fields.

Tokamak devices are devices in which plasma is created in a toroidal space and is confined therein by an appropriate combination of toroidal and poloidal magnetic fields. Such devices are useful in the study and analysis of plasmas, and particularly in the generation, confinement, study and analysis of hydrogenic plasmas. Such devices are among the most useful of known plasma devices for the reaction of deuterium and tritium with the production of high energy neutrons as reaction products. The present invention finds particular utility in respect to such devices and their applications, including experimental devices and the use thereof in experimentation and investigation in respect to toroidal plasma devices of the tokamak type.

In tokamak devices, gases are disposed in a toroidal space within a toroidal confinement vessel. The gases are ionized to produce a plasma that is heated and confined by appropriate magnetic and electrical fields.

In accordance with the present invention, a toroidal electrical current in the plasma is driven inductively by moving magnetized liquid metal and the toroidal space relative to one another in a magnetic field. A vessel defines a reservoir and confines liquid therein. A toroidal liner disposed within said vessel defines a toroidal space within the liner confines gas therein. Liquid metal fills the reservoir outside the liner. A magnetic field is established in the liquid metal to develop magnetic flux linking the toroidal space. The gas is ionized. The liquid metal and the toroidal space are moved relative to one another transversely of the space to generate electric current by induction in the ionized gas in the toroidal space about its major axis and thereby heat plasma developed in the toroidal space.

Thus, a primary object of the present invention is to provide a tokamak apparatus and method wherein liquid metal is moved through a magnetic field to generate a toroidal electric field in a toroidal plasma. Other objects and advantages of the invention will become apparent from the following detailed description, particularly when taken in conjunction with the accompanying drawings in which:

FIG. 4 is an illustration, partly diagrammatic and partly in axial section, of a tokamak device utilizing the present invention for producing a toroidal electric field.

One of the more difficult aspects of high temperature plasma devices is the confinement of the plasma, which is ionized gas. This can be accomplished by the now well-known tokamak device. It has a toroidal containment vessel for containing the gas and the plasma. Twisting magnetic fields are created within the toroidal vessel to confine the plasma and keep it from striking the walls of the toroidal vessel. These fields include toroidal and poloidal components as produced by the flow of electric current. The manner of creating such fields is illustrated conceptually in FIGS. 1 and 2, and a generalized and simplified form of tokamak device is illustrated in FIG. 3.

Figure 1:
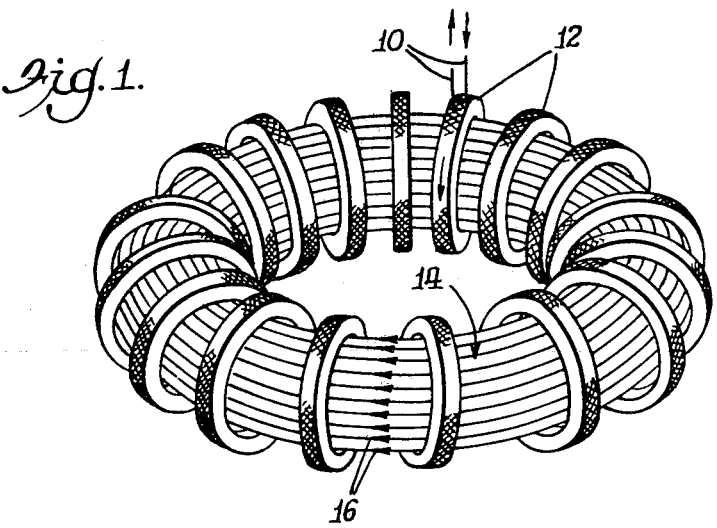
FIG. 1 is a stylized illustration of the manner of producing a toroidal magnetic field in a tokamak device.

In FIG. 1 is illustrated means for producing the toroidal magnetic field component. Electrical current is applied over conductors 10 to toroidal field coils 12. The current in these coils links a toroidal space 14 and hence generates a toroidal magnetic field 16 therein, as indicated by the arrows.

Figure 2:
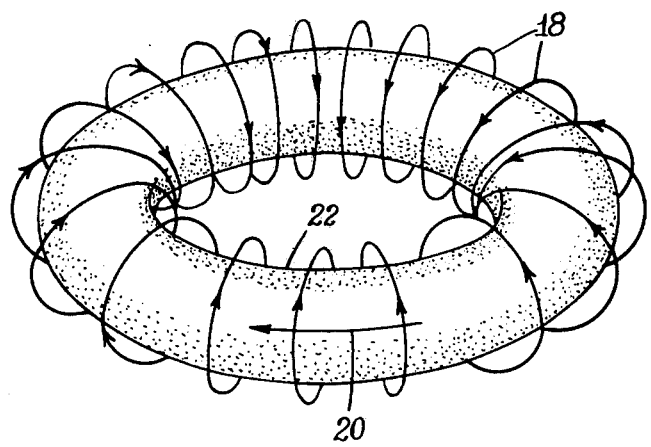
FIG. 2 is a stylized illustration of the manner of producing a poloidal magnetic field in a tokamak device.

In FIG. 2 is illustrated means for producing the principal poloidal magnetic field component that is necessary for stable confinement. In this device the poloidal field 18, as indicated by the arrows, is induced by toroidal current 20 in the plasma 22. In practice electric current in equilibrium field coils outside the torus generates an additional poloidal magnetic field which modifies the principal poloidal field to control the position of the plasma.

Figure 3:
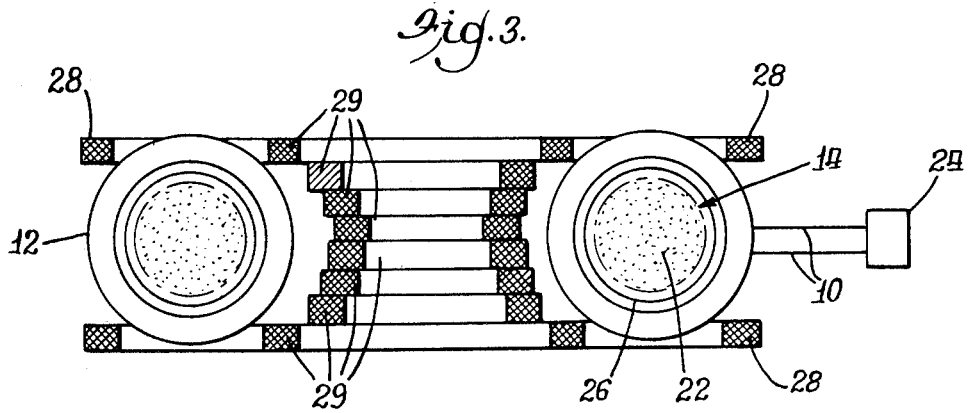
FIG. 3 is a stylized illustration of a conventional tokamak device.

As generalized, a conventional tokamak device, as illustrated in FIG. 3, combines the features of FIGS. 1 and 2 to provide a high level of plasma stability. As there illustrated, current from a power source 24 is applied over the conductors 10 to the toroidal field coils 12 which are disposed around a toroidal liner 26 which contains and defines the toroidal space 14 in which the plasma 22 is created. The equilibrium field coils 28 are supplied with electrical current from a source not illustrated to position the plasma 22 within the liner 26. Ohmic heating coils 29, also supplied with electrical current from a source not illustrated, induce current in the plasma 22 to ionize the gas, heat the plasma, and generate the poloidal magnetic field illustrated in FIG. 2.

In FIG. 4 is illustrated a preferred form of the invention for inducing current in the plasma 22. It is thus a supplement to, or a replacement for, the ohmic heating coils 29 of more conventional tokamak devices. In this preferred embodiment of the present invention, a pressure vessel 30 forms a reservoir filled with liquid metal 32. A toroidal liner 34 is supported within the liquid metal 32 by struts 36 extending to the vessel 30. The pressure vessel 30 is formed of material, such as stainless steel, capable of withstanding relatively high internal pressure. While various other metals are effective for certain purposes, liquid lithium is preferred for the liquid metal 32, particularly for deuterium-tritium plasma devices, for lithium is suitable for moderating resultant neutrons and acts to breed tritium fuel by reaction with the neutrons:

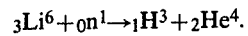

$$_3Li^6 + _0n^1 \rightarrow {_1H^3} + {_2He^4}.$$

The toroidal liner 34 is preferably formed of electrically insulating material. The liner 34 defines a toroidal space 38 in which gas is confined for producing plasma. The liner 34 separates the liquid metal 32 from the toroidal space 38, forming a bubble of gas in a pool of liquid metal. Electrically insulating material 40 separates the liquid metal 32 from the walls of the pressure vessel 30.

The toroidal magnetic field may be generated in any appropriate manner. In accordance with the configuration illustrated in FIG. 1, that may be by means of toroidal field coils 12 which may be disposed inside or outside of the pressure vessel 30. Where the coils are disposed outside of the vessel 30, the shape of the vessel may be modified accordingly. Similarly, the field created by the equilibrium field coils may be generated in any appropriate manner. For example, the equilibrium field coils may be disposed on or within the toroidal liner 34. If ohmic heating coils are used for heating in addition to the heating produced by the present invention, the ohmic heating coils may also be disposed on or within the toroidal liner 34.

In accordance with the present invention, a magnetic field is applied transversely of the toroidal space 38 to develop magnetic flux linking the space, as illustrated by the arrows 42 and associated dashed lines. Such field may be produced, as shown, by field coils 44 and 46 supplied with power from a power supply 48. It is desirable that the plasma be created in a space initially relatively free from non-toroidal magnetic fields in order that the plasma may be created relatively efficiently. This is because, upon the initial ionization of the plasma and before substantial plasma current is developed, the ions tend to diffuse to the walls of the toroidal space along the lines of magnetic flux. To discourage this migration, all non-toroidal magnetic field components are kept relatively low in the plasma region. To this end, the field coils 44 and 46 are disposed so that the hyperbolic magnetic axis 50 of the field is located at about the minor axis of the toroidal space 38, as illustrated. As an alternative, a null field may be achieved within the plasma region by coils carried by the liner 34.

Initiation of ionization in the toroidal space 38 may be by any appropriate means, such as by electronic beam bombardment. However, preferred means is radio frequency ionization by application of radio frequency electromagnetic energy to the toroidal space. This may be by way of waveguides 51 and microwave horn antennas 52 disposed around the major circumference and energized by a microwave radio frequency source 54.

When the gas within the toroidal space is ionized, it functions as a conductor. Hence, the ionized gas in the toroidal space 38 acts as a single turn coil linked by the magnetic flux created therewithin by the field coils 44 and 46. Any change in the linking flux thus induces the flow of current within the gas by causing movement of the electrons therein. Thus by changing this magnetic flux, ionization of the gas is completed and the flow of current is comparable to that produced by the ohmic heating coils of the more conventional tokamak devices.

In accordance with the present invention, the change in linking flux is produced by movement of the liquid metal 32 relative to the toroidal space 38. In the apparatus illustrated in FIG. 4, an upper piston 56 and a lower piston 58 are movably disposed in upper and lower cylinders 60 and 62, respectively. The pistons 56 and 58 separate the liquid metal 32 from driving fluids from pressure sources 64 and 66, respectively. A plurality of radial pistons 68 are disposed about the periphery of the pressure vessel on its equatorial plane. Such pistons are disposed in radial cylinders 70 and act to separate the liquid metal 32 from driving fluid supplied by a radial pressure source 72. The driving fluids may be liquid or gas as may be convenient. The pressures in the respective chambers may be controlled by a controller 74 to apply appropriate pressures through the driving fluids to the respective pistons. Increasing the pressures to force the pistons 56 and 58 inwardly while permitting the piston 68 to move outwardly results in displacement of the liquid metal 32 outwardly, that is, transversely of the magnetic field produced by the field coils 44 and 46 and transversely of the toroidal space 38. The magnetic flux being in a conductive liquid, the laws of physics, and more particularly the laws of magnetohydrodynamics, cause the flux lines to follow the moving liquid with a certain time constant for returning to their rest position as illustrated in FIG. 4. That is, the movement of the liquid metal 32 carries the flux with it, causing the flux linking the toroidal space 34 to change with time. Such change of linking flux induces current in the ionized gas in toroidal space 38, further ionizing the gas and heating it. The extent of such heating depends upon the rate at which the liquid metal is driven, which depends upon the power applied to the respective pistons.

The tokamak device of the present invention is operated in pulsed fashion, which includes single pulse operation. If time $T_o$ is the time of driving the liquid metal relative to the toroidal space, a preferred method of operation is to start the generation of the toroidal magnetic field a few seconds before $T_o$, so that the field may reach its operating strength by time $T_o$. About a second before $T_o$, the field coils 44 and 46 begin generation of the transverse field. A few hundred microseconds before $T_o$, the gas is preionized by the radio frequency field created by the antennas 52. Then at time $T_o$, the pistons drive the liquid metal 32 transversely of the toroidal space and the transverse field to increase ionization of the gas and heat the gas.

As mentioned above, although a preferred embodiment of the invention has been shown and described, a number of modifications may be made thereto within the scope of the invention. For example, in addition to modifications mentioned above, the toroidal liner 34 and the plasma therein may be moved to enclose different magnetic lines of flux, as by collapsing the liner 34 to move inwardly toward its major axis. This requires a collapsible liner and different programming of the pressures applied at the respective pistons 56, 58, and 68. It is also within the scope of the invention to move the liner 34 inwardly while moving the liquid metal 32 outwardly.

It should also be noted that details of well-known components of tokamak devices have been omitted from the drawings in order that the essential parts of the invention may be more easily shown and understood. For example, the liner 34 may include ohmic heating coils and vertical field coils, as mentioned above. Further, this liner may be formed in two parts, an external pressure resistant liner spaced from an interior thin metal plasma liner, with vacuum therebetween.

What is claimed is:

1. Tokamak apparatus comprising a vessel for defining a reservoir and confining liquid therein, a torodial liner solid structure disposed within said vessel for defining a toroidal space within said liner and confining gas therein, liquid metal filling said reservoir outside of and completely surrounding said liner, gas contained in said toroidal space, means for developing poloidal magnetic flux in said liquid metal linking said toroidal space, said flux being substantially uniformly distributed around the major axis of said toroidal space, and means for moving said liquid metal transversely of said liner to generate substantial toroidal electric current in said gas about the major axis of said toroidal space, said means comprising at least a first and second means, said first means being positioned for substantial movement along said major axis and said second means being positioned for substantial movement along the mid-plane of said toroidal space, the movement of said liquid metal relative to said liner being substantially uniformly distributed around the major axis of said toroidal space and substantially radially inward or outward with respect to said major axis and said movement being substantially symmetrically distributed about the mid-plane of said toroidal space.

2. Apparatus according to claim 1 wherein said means for developing a magnetic flux develops a hyperbolic magnetic axis within said toroidal space when said liquid metal is at rest relative to said toroidal liner.

3. Apparatus according to claim 2 including means for preionizing said gas.

4. Apparatus according to claim 1 wherein said toroidal liner is disposed in fixed position within said vessel and said liquid metal is movable relative thereto.

5. Apparatus according to claim 4 wherein said means for developing a magnetic flux develops a hyperbolic magnetic axis within said toroidal space when said liquid metal is at rest.

6. Apparatus according to claim 5 including means for preionizing said gas.

7. Apparatus according to any one of claims 1 to 6 wherein said poloidal magnetic field has its hyperbolic axis at substantially the minor axis of said toroidal space.

8. A method of operating a tokamak device comprising establishing a toroidal space in a pool of liquid metal, said space being filled with gas and defined by a toroidal liner solid structure, said liquid metal completely surrounding said liner, establishing poloidal magnetic flux in said liquid metal linking said toroidal space, said flux being substantially uniformly distributed around the major axis of said toroidal space, moving said liquid metal transversely of said space to generate substantial toroidal electric current through said gas about the major axis of said toroidal space, said movement including a first and second movement, said first movement being substantially along said major axis and said second movement being substantially along the mid-plane of said toroidal space, with an inward movement of one of said first and second movements resulting in an outward movement of the other of said first and second movements, the movement of said liquid metal relative to said liner being substantially uniformly distributed around the major axis of said toroidal space and substantially radially inward or outward with respect to said major axis and said movement being substantially symmetrically distributed about the mid-plane of said toroidal space.

9. A method according to claim 8 wherein the poloidal magnetic flux within said toroidal space transversely thereof develops a hyperbolic magnetic axis therein when said liquid is at rest relative to said toroidal space.

10. A method according to claim 9 wherein said gas is preionized before moving said liquid metal.

11. A method according to claim 8 wherein said liquid metal is moved relative to a fixed liner.

12. A method according to claim 11 wherein the poloidal magnetic flux within said toroidal space transversely thereof develops a hyperbolic magnetic axis therein when said liquid metal is at rest.

13. A method according to claim 12 wherein said gas is preionized before moving said liquid metal.

14. A method according to any one of claims 8 to 13 wherein said magnetic flux is established by a poloidal magnetic field having its hyperbolic axis at substantially the minor axis of said toroidal space.

* * * * *